(12) United States Patent  (10) Patent No.: US 7,677,737 B2
Lonn  (45) Date of Patent: Mar. 16, 2010

(54) PROJECTOR ADAPTATION FOR SELF-CALIBRATION

(75) Inventor: Fredrik Alexander Lonn, Sondra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 721 days.

(21) Appl. No.: 11/465,351

(22) Filed: Aug. 17, 2006

(65) Prior Publication Data

US 2008/0043205 A1  Feb. 21, 2008

(51) Int. Cl.
*G03B 21/14* (2006.01)
*G03B 21/00* (2006.01)
*G09G 5/02* (2006.01)

(52) U.S. Cl. .......................... 353/69; 353/122; 345/589

(58) Field of Classification Search .................... 353/28, 353/30–31, 69–70, 121–122; 463/34; 345/589
See application file for complete search history.

(56) References Cited

U.S. PATENT DOCUMENTS

| | | | |
|---|---|---|---|
| 5,081,523 | A | 1/1992 | Frazier |
| 5,231,481 | A | 7/1993 | Eouzan et al. |
| 6,618,076 | B1 | 9/2003 | Sukthankar et al. |
| 6,814,448 | B2 * | 11/2004 | Ioka ............................ 353/69 |
| 6,921,172 | B2 * | 7/2005 | Ulichney et al. ............... 353/69 |
| 7,167,645 | B2 * | 1/2007 | Matsuda et al. ............. 396/213 |
| 7,182,465 | B2 * | 2/2007 | Fuchs et al. .................... 353/69 |
| 7,333,135 | B2 * | 2/2008 | Foote et al. ............. 348/211.12 |
| 2002/0008856 | A1 * | 1/2002 | Okamori et al. ............... 353/69 |
| 2004/0150835 | A1 | 8/2004 | Frick et al. |
| 2005/0001991 | A1 * | 1/2005 | Ulichney et al. ............... 353/69 |
| 2007/0099700 | A1 * | 5/2007 | Solomon et al. ............... 463/34 |
| 2007/0171380 | A1 * | 7/2007 | Wright et al. .................. 353/69 |

FOREIGN PATENT DOCUMENTS

EP  1 365 600 A2  11/2003
WO  WO 97/48232 A1  12/1997

OTHER PUBLICATIONS

International Search Report and Written Opinion dated Jun. 29, 2007.
PCT International Preliminary Report on Patentability issued in corresponding international application No. PCT/IB2007/050522, mailed Oct. 15, 2008, 5 pages.

* cited by examiner

*Primary Examiner*—Georgia Y Epps
*Assistant Examiner*—Jori S Byrne-Diakun
(74) *Attorney, Agent, or Firm*—Harrity & Harrity, LLP

(57) ABSTRACT

A device includes a projector to project an image onto a surface. The device also includes a camera to capture a picture of the image, while it is being projected onto the surface, and a portion of an area surrounding the projected image. The device identifies a lightest portion in the projected image. The device adjusts a setting of the projector based on a comparison of an intensity of the identified lightest portion to an intensity of the portion of the area surrounding the projected image.

19 Claims, 15 Drawing Sheets

COMPARE POINT IN PROJECTED IMAGE TO POINT IN SURROUNDING AREA

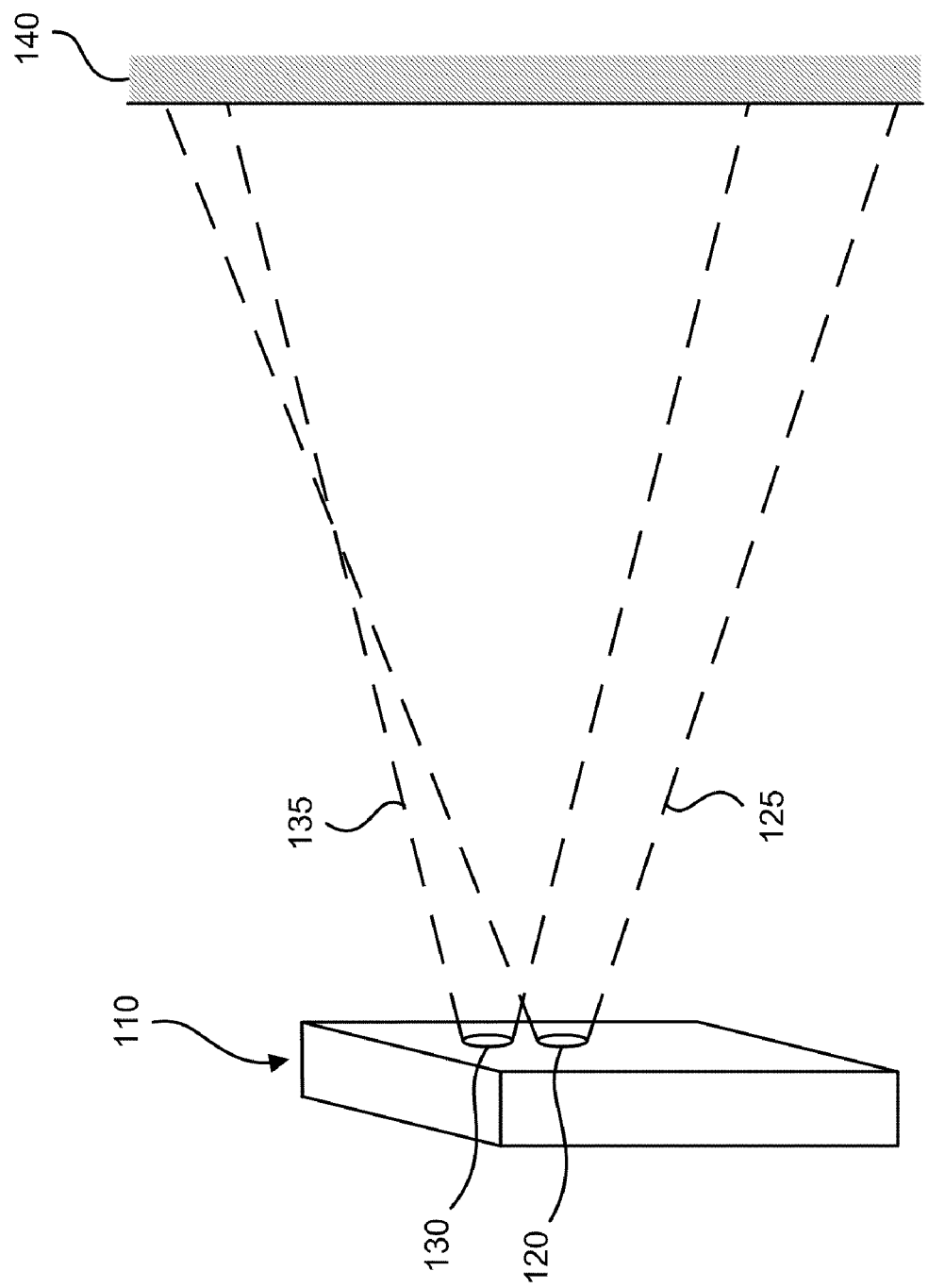

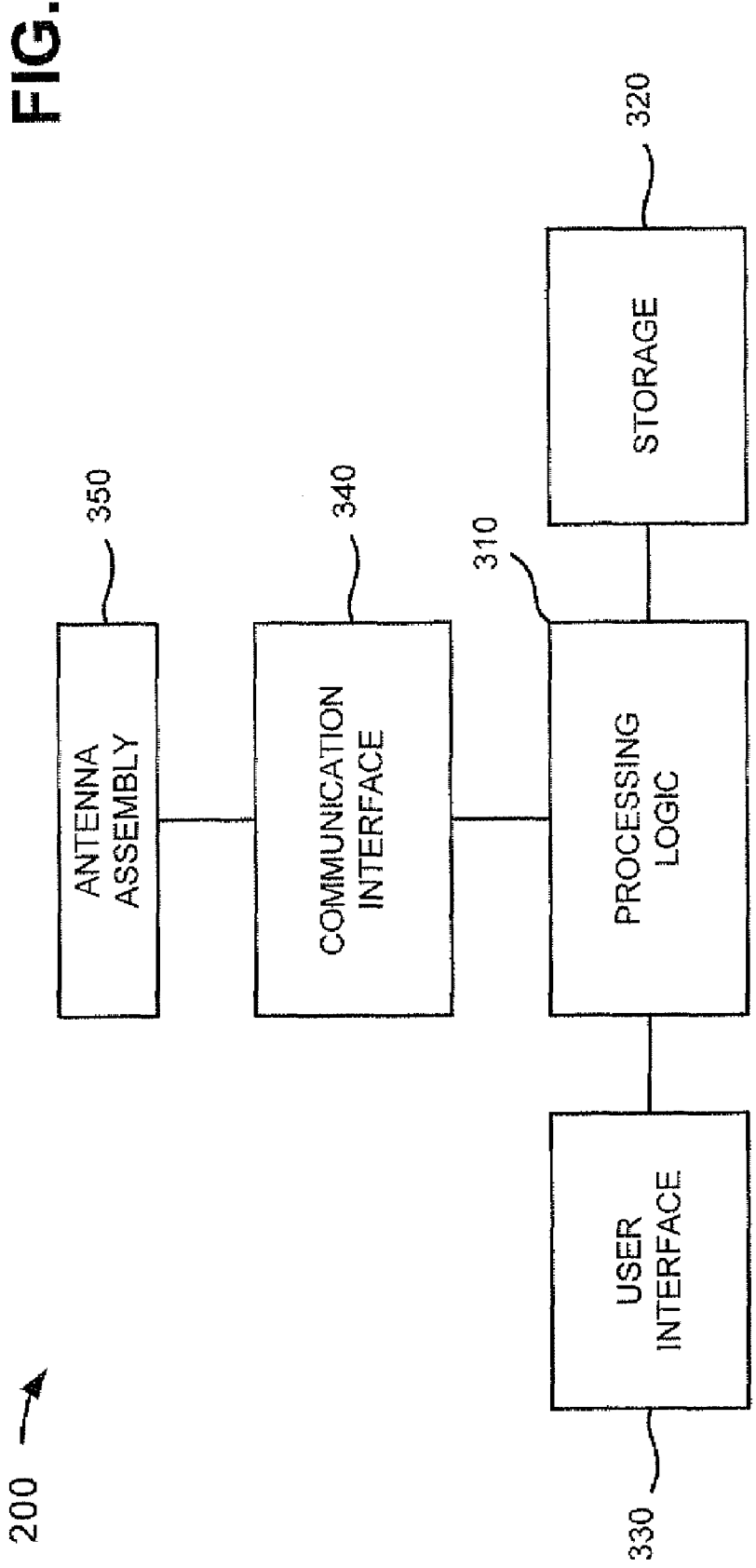

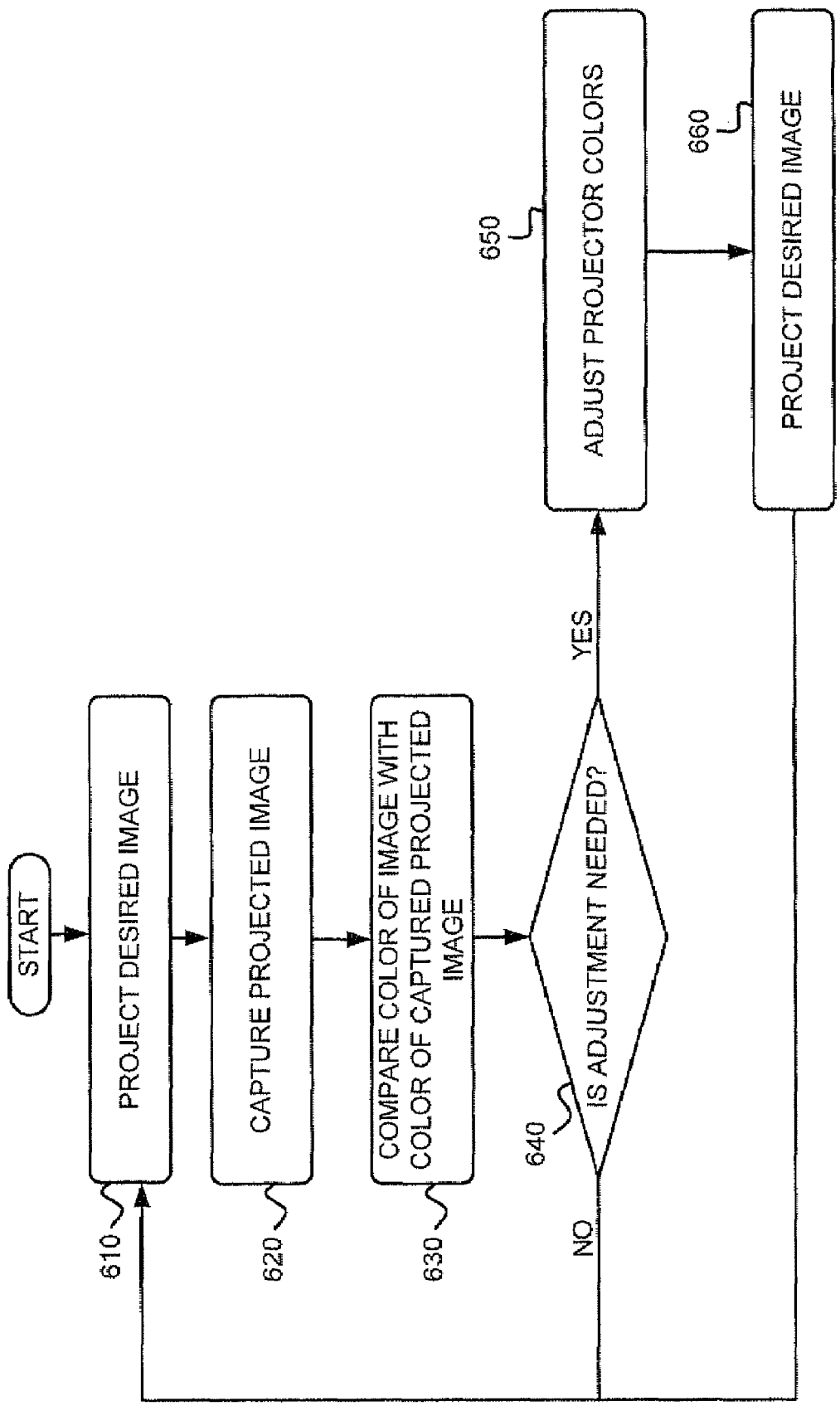

PROJECTOR ADAPTATION FOR SELF-CALIBRATION

BACKGROUND

1. Field of the Invention

Implementations described herein relate generally to devices and, more particularly, to a device that adapts one or more settings of a projector based on a surface at which an image is projected.

2. Description of Related Art

A projector is a device that projects images onto a surface. Typically, the best surface for such projections is a neutral-colored projection screen. Such screens are not always available, however. As such, projections onto other types of surfaces (e.g., non-neutral-colored surfaces) may be made. These types of surfaces may, for example, cause projected images to have a non-neutral tint or cause the images to lack one or more colors.

SUMMARY

According to one aspect, a method may include projecting, via a projector, an image onto a surface; and using a picture of the projected image to automatically alter a setting of the projector.

Additionally, the projecting an image may include projecting a predetermined image.

Additionally, the using may include capturing a picture of the image while it is being projected onto the surface, and analyzing the captured picture to determine whether to perform a color adjustment.

Additionally, the image may include a neutral-colored image.

Additionally, the capturing may occur automatically in response to the projecting an image onto a surface.

Additionally, the using may include capturing a picture of the image while the image is being projected onto the surface, comparing the picture to the image, and determining that the setting of the projector is to be altered when the picture of the projected image does not substantially match the image.

Additionally, the capturing may occur automatically in response to the projecting an image onto a surface.

Additionally, the capturing may occur at predetermined intervals.

Additionally, the setting may include one or more projection colors.

Additionally, the setting may include an intensity setting.

Additionally, the using a picture may include capturing the picture of the projected image while the image is being projected onto the surface, the picture including the projected image and a portion of an area surrounding the picture, comparing an intensity of the projected image to an intensity of the portion, and determining that the setting of the projector is to be altered when the intensity of the projected image is within a threshold of the intensity of the portion.

Additionally, the using a picture may include capturing the picture of the projected image while the image is being projected onto the surface, comparing a contrast of the projected image to a contrast of the image, and determining that the setting of the projector is to be altered when the contrast of the projected image does not substantially match the contrast of the image.

Additionally, the setting may include a color setting and an intensity setting.

According to another aspect, a device may include a projector to project an image onto a surface; a camera to capture a picture of the image while it is being projected onto the surface; and logic to receive the picture and adjust a setting of the projector based on the received picture.

Additionally, when adjusting a setting, the logic may be configured to use the picture to determine whether to perform a color adjustment.

Additionally, the image may include a neutral-colored image.

Additionally, the camera may be configured to capture the picture automatically in response to the projector projecting the image.

Additionally, when adjusting the setting, the logic may be configured to compare the picture to the image, and determine that the setting of the projector is to be altered when the picture of the projected image does not substantially match the image.

Additionally, the camera may capture the picture automatically in response to the projector projecting the image.

Additionally, when comparing the picture to the image, the logic may be configured to compare colors in the picture to colors in the image.

Additionally, when comparing the picture to the image, the logic may be configured to compare a contrast of the picture to a contrast of the image.

Additionally, the camera may be further configured to capture a picture of the projected image at predetermined intervals.

Additionally, when adjusting a setting, the logic may be configured to use the picture to determine whether to perform an intensity adjustment.

Additionally, wherein when adjusting a setting, the logic may be configured to compare an intensity of a first portion of the picture to an intensity of a second portion of the picture, and determine that the setting of the projector is to be altered when the intensity of the first portion is within a threshold of the intensity of the second portion.

According to yet another aspect, a computer-readable medium may be configured to store instructions that, when executed by at least one processor, cause the at least one processor to perform a method comprising receiving a picture of an image projected onto a surface by a projector; and adjusting a setting of the projector based on the received picture.

Additionally, the adjusting may include adjusting one or more colors output by the projector.

Additionally, the adjusting may include adjusting an intensity output by the projector.

According to still another aspect, a method may include projecting, via a projector, an image onto a surface; capturing a picture of the projected image; and adjusting a setting of the projector based on a content of the captured picture.

Additionally, the image may include a predetermined neutral-colored image.

Additionally, the adjusting may include adjusting a color output of the projector for at least one other image projected by the projector.

Additionally, the image may include a user-specified image.

Additionally, the adjusting may include comparing a color of the captured picture to a color of the user-specified image, and adjusting a color output of the projector when the color of the captured picture does not substantially match the color of the user-specified image.

Additionally, the method may further include re-projecting the image based on the adjusted color output.

Additionally, the adjusting may include comparing a contrast of the captured picture to a contrast of the user-specified image, and adjusting an intensity output of the projector when the contrast of the captured picture does not substantially match the contrast of the user-specified image.

Additionally, the adjusting may include comparing an intensity of a first portion of the captured picture to an intensity of a second portion of the captured picture, and adjusting an intensity output of the projector when the intensity of the first portion substantially matches the intensity of the second portion.

According to still yet another aspect, a device may include means for projecting an image onto a surface; means for capturing a picture of the projected image; and means for adjusting a color of at least one image projected by the means for projecting based on the captured picture.

According to yet another aspect, a device may include a projector; a camera to capture a picture of a surface; and logic to receive the picture, and adjust a setting of the projector based on the received picture.

According to still yet another aspect, a projector includes a camera to capture a picture of an image as it is being projected onto a surface by the projector; and logic to receive the image and the captured picture, compare a feature of the image to a feature of the captured picture, and automatically adjusting an output of the projector when the feature of the captured picture does not substantially match the feature of the image

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is an exemplary diagram illustrating concepts consistent with principles of the invention;

FIG. 3 is a diagram of exemplary components of the exemplary device of FIGS. 2A and 2B;

FIG. 6 is a flow chart of another exemplary process for adjusting colors of a projector in an implementation consistent with principles of the invention;

DETAILED DESCRIPTION

Figure 2A:
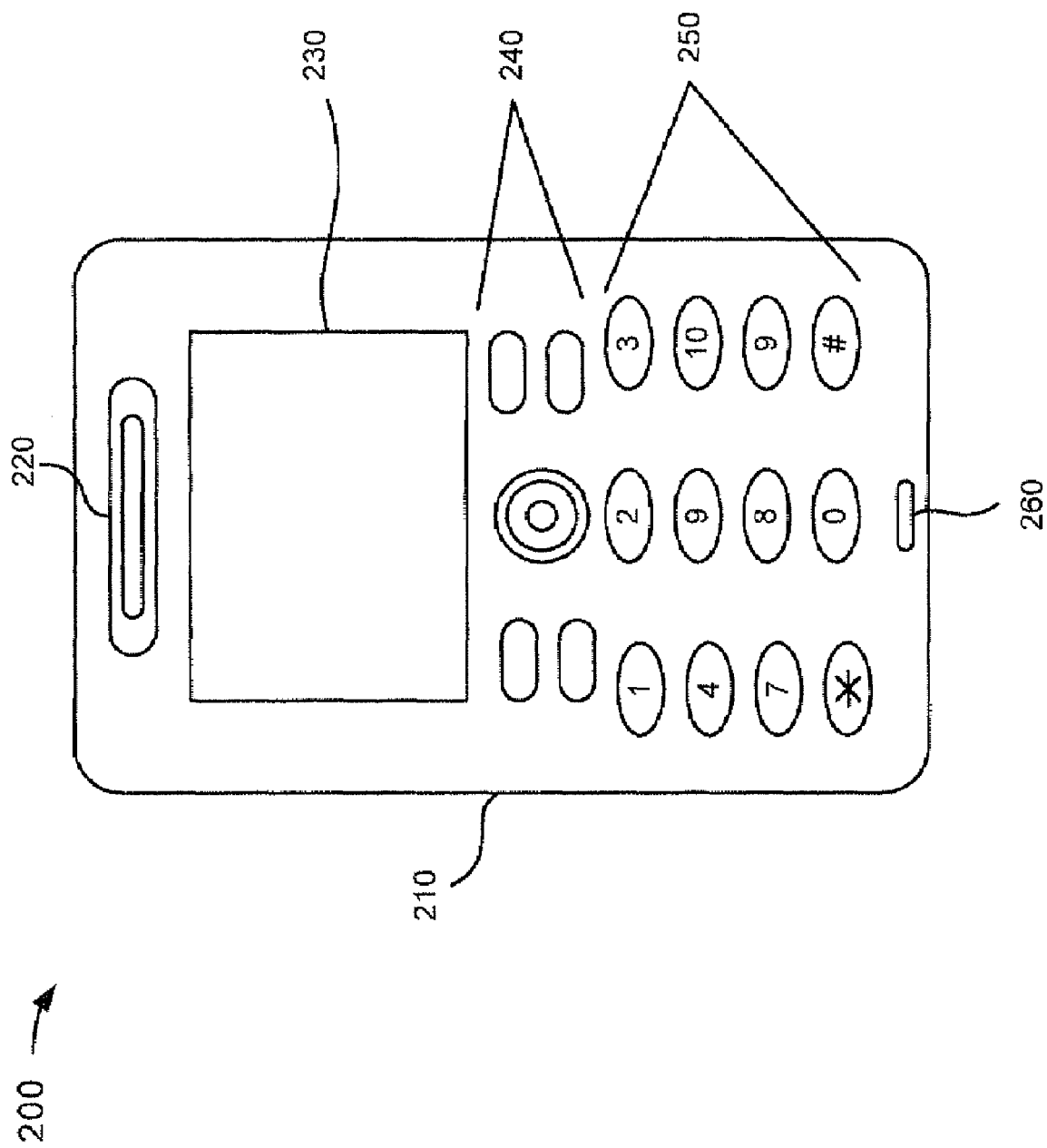
FIG. 2A is a front view of an exemplary device in which systems and methods consistent with principles of the invention may be implemented.

The following detailed description of the invention refers to the accompanying drawings. The same reference numbers in different drawings may identify the same or similar elements. Also, the following detailed description does not limit the invention.

Implementations consistent with principles of the invention may relate to adjusting the output of a projector based on the surface on which an image is projected by the projector. In one implementation, a camera may be used to calibrate the resulting color of the image projected onto the surface, resulting in true or at least improved color reproduction of the image.

FIG. 1 is an exemplary diagram illustrating concepts consistent with principles of the invention. As shown in FIG. 1, a device 110 may include a camera 120 and a projector 130. Camera 120 may have a field of view 125 on a surface 140, as illustrated in FIG. 1. Similarly, projector 130 may have a projection area 135 on surface 140. In implementations consistent with principles of the invention, camera 120 may capture an image of surface 140 and use this image to calibrate the output of projector 130.

A "device," as the term is used herein, is to be broadly interpreted to include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a camera (e.g., video and/or still image camera), a sound recorder (e.g., a microphone), a Doppler receiver, and/or global positioning system (GPS) receiver; a laptop; a GPS device; a camera (e.g., video and/or still image camera); a sound recorder (e.g., a microphone); and any other computation or communication device capable of capturing images and projecting images, such as a personal computer, etc. In one implementation consistent with principles of the invention, a "device" may include a projector that includes or is associated with a camera.

Exemplary Device Architecture

FIG. 2A is a front view of an exemplary device 200 according to an implementation consistent with principles of the invention. In one implementation, device 200 may correspond to device 110. As shown in FIG. 2A, device 200 may include a housing 210, a speaker 220, a display 230, control buttons 240, a keypad 250, and a microphone 260. Housing 210 may protect the components of device 200 from outside elements. Speaker 220 may provide audible information to a user of device 200. Display 230 may provide visual information to the user. For example, display 230 may provide information regarding incoming or outgoing calls, media, games, phone books, the current time, etc. In an implementation consistent with principles of the invention, display 230 may act as a view screen. Control buttons 240 may permit the user to interact with device 200 to cause device 200 to perform one or more operations. Keypad 250 may include a standard telephone keypad. Microphone 260 may receive audible information from the user.

Figure 2B:
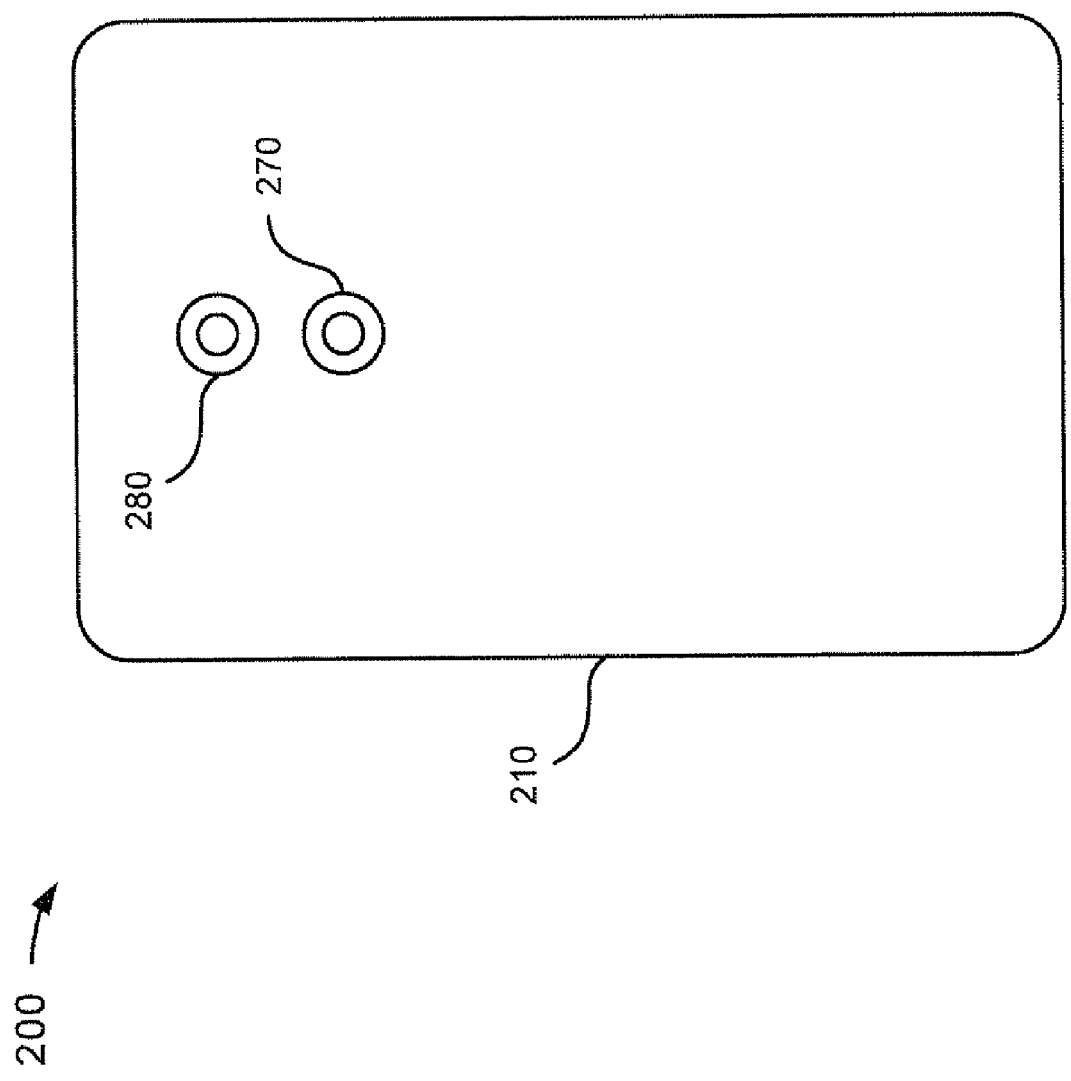
FIG. 2B is a rear view of an exemplary device in which systems and methods consistent with principles of the invention may be implemented.

FIG. 2B is a rear view of an exemplary device 200 according to an implementation consistent with principles of the invention. As shown in FIG. 2B, device 220 may include a camera 270 and a projector 280. Camera 270 may enable a user to capture and store images (e.g., pictures) and/or video. Projector 280 may enable a user to project an image (e.g., a picture, text, etc.) onto a surface. In one implementation, camera 270 and projector 280 may be positioned so that a field of view of camera 270 encompasses the projection area of projector 280. In other implementations, camera 270 and projector 280 may be positioned so that a field of view of camera 270 may include a portion of the projection area of projector 280.

FIG. 3 is a diagram of exemplary components of device 200. As shown in FIG. 3, device 200 may include processing logic 310, storage 320, a user interface 330, a communication interface 340, and an antenna assembly 350. Processing logic 310 may include a processor, microprocessor, an application specific integrated circuit (ASIC), field programmable gate array (FPGA), or the like. Storage 320 may include a random access memory (RAM), a read only memory (ROM), and/or another type of memory to store data and instructions that may be used by processing logic 310 to control operation of device 200 and its components.

User interface 330 may include mechanisms for inputting information to device 200 and/or for outputting information from device 200. Examples of input and output mechanisms might include a speaker (e.g., speaker 220) to receive electrical signals and output audio signals, a camera (e.g., camera 270) to receive image and/or video signals and output electrical signals, a projector (e.g., projector 280) to receive images and/or electrical signals and project those images, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information (e.g., information from camera 270), and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks). Antenna assembly 350 may include one or more antennas to transmit and receive RF signals over the air. Antenna assembly 350 may receive RF signals from communication interface 340 and transmit them over the air and receive RF signals over the air and provide them to communication interface 340.

As will be described in detail below, device 200, consistent with principles of the invention, may perform certain operations relating to projecting images and adjusting an output of a projector based on a surface on which an image is projected by the projector. Device 200 may perform these operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Computer Readable Medium

Figure 4:
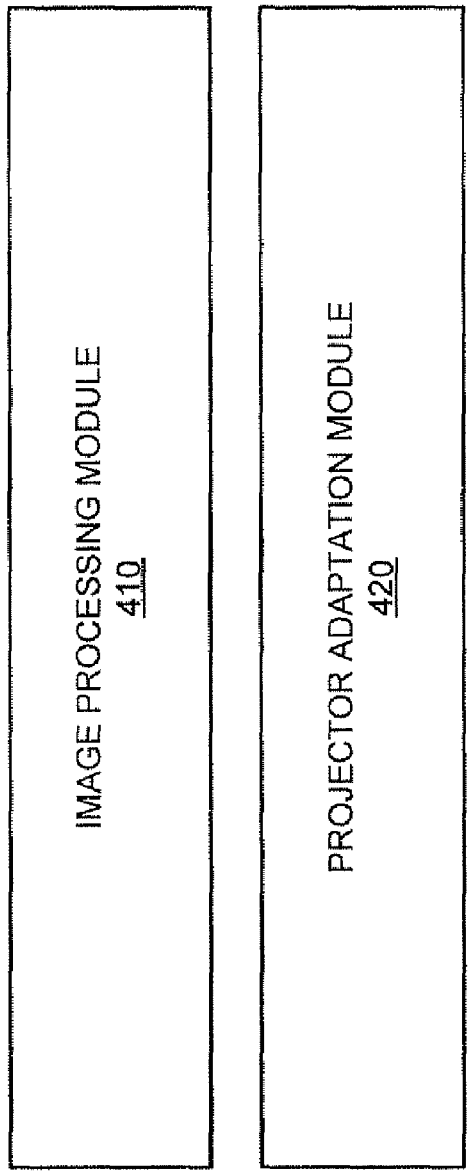
FIG. 4 is a diagram of a portion of an exemplary computer-readable medium that may be associated with the exemplary device of FIGS. 2A and 2B.

FIG. 4 is a diagram of a portion of an exemplary computer-readable medium 400 that may be associated with a device, such as device 200. In one implementation, computer-readable medium 400 may correspond to storage 320 of device 200. The portion of computer-readable medium 400 illustrated in FIG. 4 may include an image processing module 410 and a projector adaptation module 420.

Image processing module 410 may include software that receives an image and analyzes the image. For example, in some implementations consistent with principles of the invention, image processing module 410 may receive an image captured by camera 270 (e.g., in the form of a picture) and may analyze the color or intensity of the received image. In one implementation, image processing module 410 may compare the color or contrast of an image captured by camera 270 to another image stored in device 200 and being projected by projector 280. Image processing module 410 may forward image processing results to projector adaptation module 420.

Projector adaptation module 420 may include software that adjusts the colors or intensity of an image being projected by projector 280 (or other settings in projector 280) or to be projected by projector 280. For example, projector adaptation module 420 may receive the image processing results from image processing module 410 and may cause one or more colors to be added to and/or subtracted from an image that is being projected or is to be projected. Projector adaptation module 420 may also or alternatively cause an intensity of a projected image to be increased or decreased.

Exemplary Processing

Figure 5:
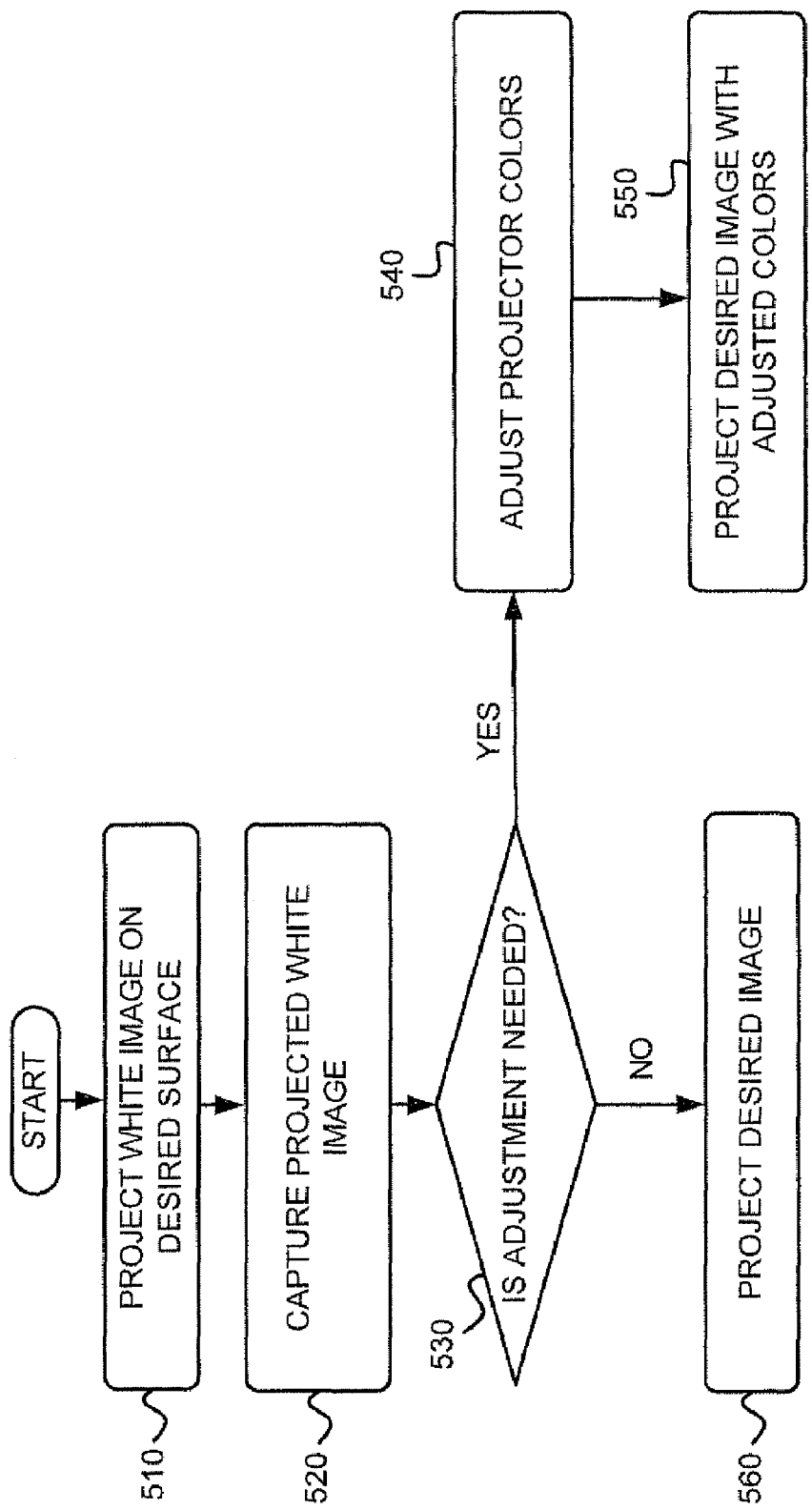
FIG. 5 is a flow chart of an exemplary process for adjusting colors of a projector in an implementation consistent with principles of the invention.

FIG. 5 is a flowchart of exemplary processing according to an implementation consistent with principles of the invention. The process of FIG. 5 may be performed by a device, such as device 200. Processing may begin with device 200 projecting a neutral-colored image onto a desired surface (block 510). In one implementation, the neutral-colored image may be a predetermined white (or other neutral color) image (e.g., a rectangle or other predetermined shape) stored in, for example, storage 320. The projected white image may take up projector 280's entire projection area displayed on the desired surface. Projector 280 may project the white image automatically (e.g., in response to some event, such as a user initiating an application with which projector 280 is associated) or in response to a user action.

While the white image is being projected on the desired surface, device 200 may capture an image of the desired surface (block 520). For example, camera 270 may capture a picture of the desired surface. The captured picture may include the entire projection area. In some instances, camera 270 may capture a picture of less than the entire projection area (e.g., when the surface is of uniform color and texture). Camera 270 may capture the picture automatically (e.g., in response to projector projecting the white image) or in response to a user action (e.g., the user pressing a shutter release).

Device 200 may determine whether an adjustment to projector 280 is needed (block 530). For example, in one implementation consistent with principles of the invention, device 200 may identify the projected white image in the picture and analyze the color of the projected white image in the captured picture. If the projected white image is completely white in the picture (or is within an acceptable threshold), device 200 may determine that no adjustment is necessary. If, on the other hand, the projected white image is not completely white in the picture (beyond an acceptable threshold), device 200 may determine that an adjustment is necessary.

If device 200 determines that an adjustment is needed (block 530), device 200 may adapt the color(s) with which projector 280 projects images so as to reflect the determined adjustment (block 540). For example, projector adaptation module 420 may add one or more colors to projected images and/or subtract one or more colors from projected images to achieve the desired result. Projector 280 may, in cooperation with projector adaptation module 420, project the desired image with the adjusted color(s) (block 550).

If, on the other hand, device 200 determines that no adjustment is needed (block 530), device 200 may project the desired image without color adjustments (block 560). In this way, the colors of projected images may be adjusted based on the color, spectral reflectance variation, etc. of the surface on which images are projected.

As an alternative to projecting the white image, in other implementations consistent with principles of the invention, device 200 may simply capture a picture of the desired surface (without an image projected thereon) and analyze the picture of the surface to determine whether a projector setting adjustment is needed. For example, if the picture depicts a green surface, device 200 may adjust the output of projector 280 based on the green surface. For example, device 200 may subtract green from projected images and/or add red and blue to projected images.

FIG. 6 is a flowchart of exemplary processing according to another implementation consistent with principles of the invention. The process of FIG. 6 may be performed by a device, such as device 200. Processing may begin with device 200 projecting a desired image on a desired surface (block 610). Projector 280 may project the desired image in response to some event, such as a user action.

While the desired image is being projected on the desired surface, device 200 may capture the projected image (block 620). For example, camera 270 may capture a picture of the area of the desired surface on which the image is being projected. The captured picture may include the entire projection area. Camera 270 may capture the picture automatically (e.g., in response to projector projecting the desired image, at predetermined intervals, etc.) or in response to a user action (e.g., the user pressing a shutter release).

Device 200 may compare the color of the desired image with the color of the projected image that is captured by camera 270 (block 630). For example, image processing module 410 may receive the image that is being projected by projector 280 (e.g., from storage 320) and the image captured by camera 270 and may compare the colors of those images.

Device 200 may determine whether an adjustment to projector 280 is needed (block 640). If, for example, the color of the projected image that is captured by camera 270 substantially matches (e.g., within some threshold) the color of the desired image, device 200 may determine that no color adjustment is needed. Processing may then return to block 610 with projector 280 projecting a next desired image.

If, on the other hand, the color of the projected image that is captured by camera 270 does not substantially match (e.g., within some threshold) the color of the desired image, image processing module 410 may determine the proper color adjustment for projecting the desired image so that the color of the image as projected on the desired surface substantially matches the color of the desired image stored in storage 320 (block 650). For example, if the color of the captured image is greener than the color of the desired image, image processing module 410 may subtract out an amount of the color green from the desired image and/or add in an amount of the colors red and blue to the desired image to make the color of the projection of the desired image more substantially match the color of the desired image. Projector 280 may, in cooperation with projector adaptation module 420, project the desired image with the adjusted color(s) (block 660). Processing may then return to block 610 with projector 280 projecting a next desired image. In this way, color adjustments can be made in on-the-fly as images are projected. Moreover, if the surface on which images are projected changes, the processing described herein would adjust the colors of the projected images based on the new surface.

Figure 7A:
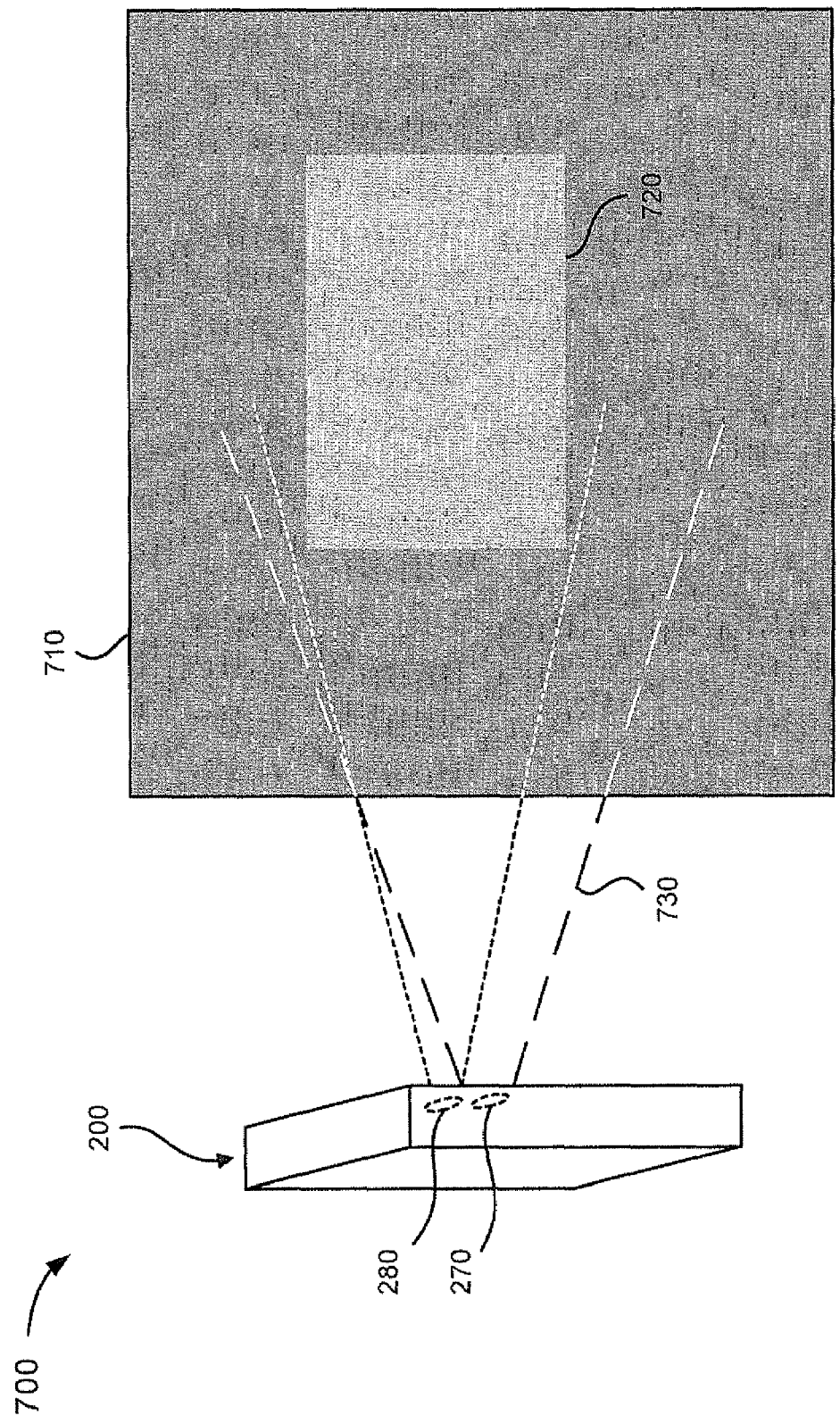
FIGS. 7A-8B are diagrams of exemplary processing consistent with principles of the invention.
Figure 7B:
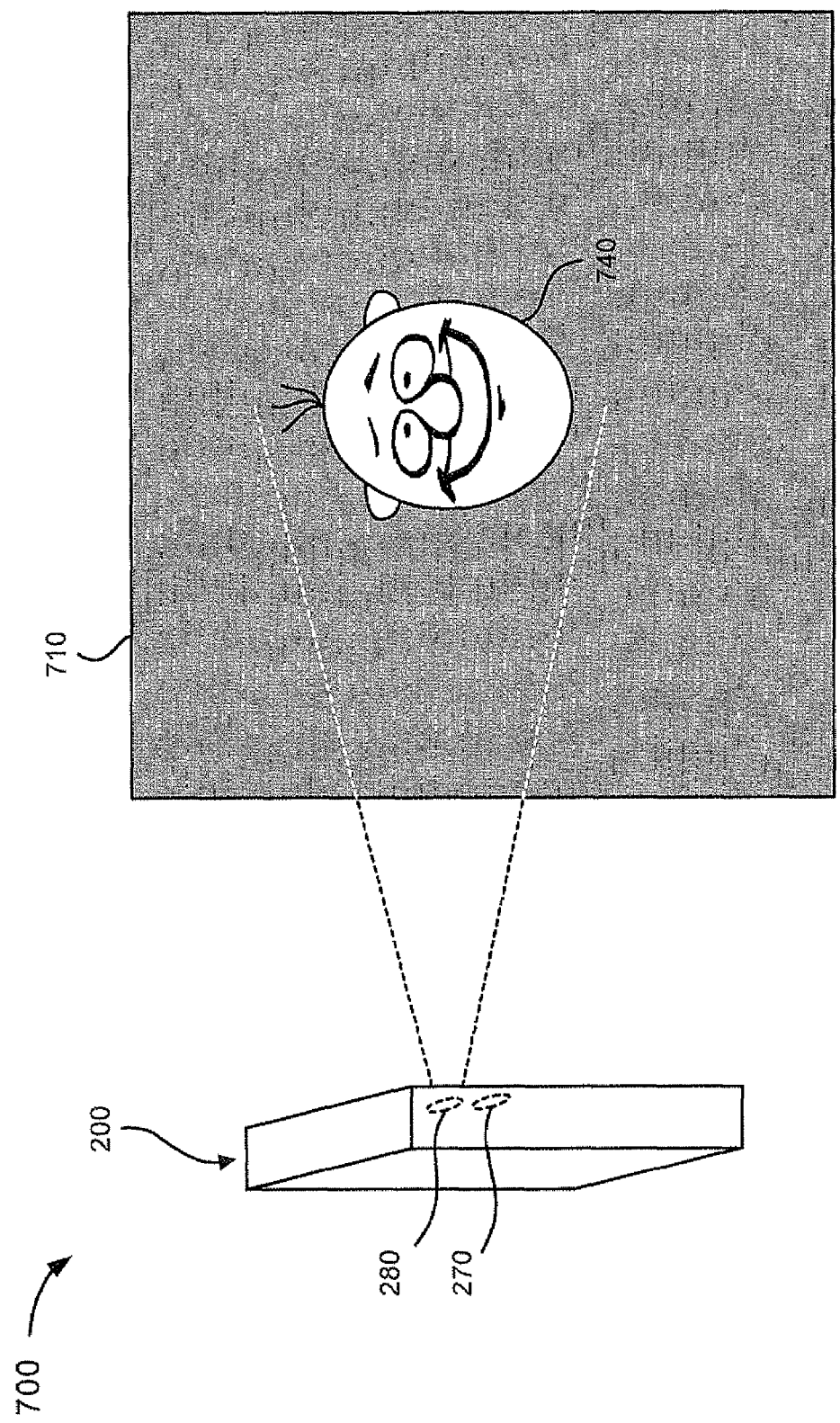

The following examples illustrate the processing described above in which a camera may be used to determine whether and how to adjust colors projected by a projector. In the first example 700, assume that a user of device 200 wants to project an image onto a surface 710, illustrated in FIG. 7A. For this example, assume that surface 710 is a green-colored surface. Device 200 may project a white image 720 (e.g., a white-colored rectangle) onto surface 710, via projector 280. Device 200 may then capture a picture 730 of projected white image 720 via camera 270. Device 200 may analyze the picture captured by camera 270 and determine whether a color adjustment is needed. In this example, assume that the green color of surface 710 affects the projection of white image 720 such that image 720 includes a shade of green. Device 200 may adjust the colors output by projector 280 based on the picture. For example, device 200 may subtract green from the outputs of projector 280 and/or add in red and blue to the outputs of projector 280. Device 200 may then project images with adjusted colors, such as image 740 illustrated in FIG. 7B, onto surface 710.

Figure 8A:
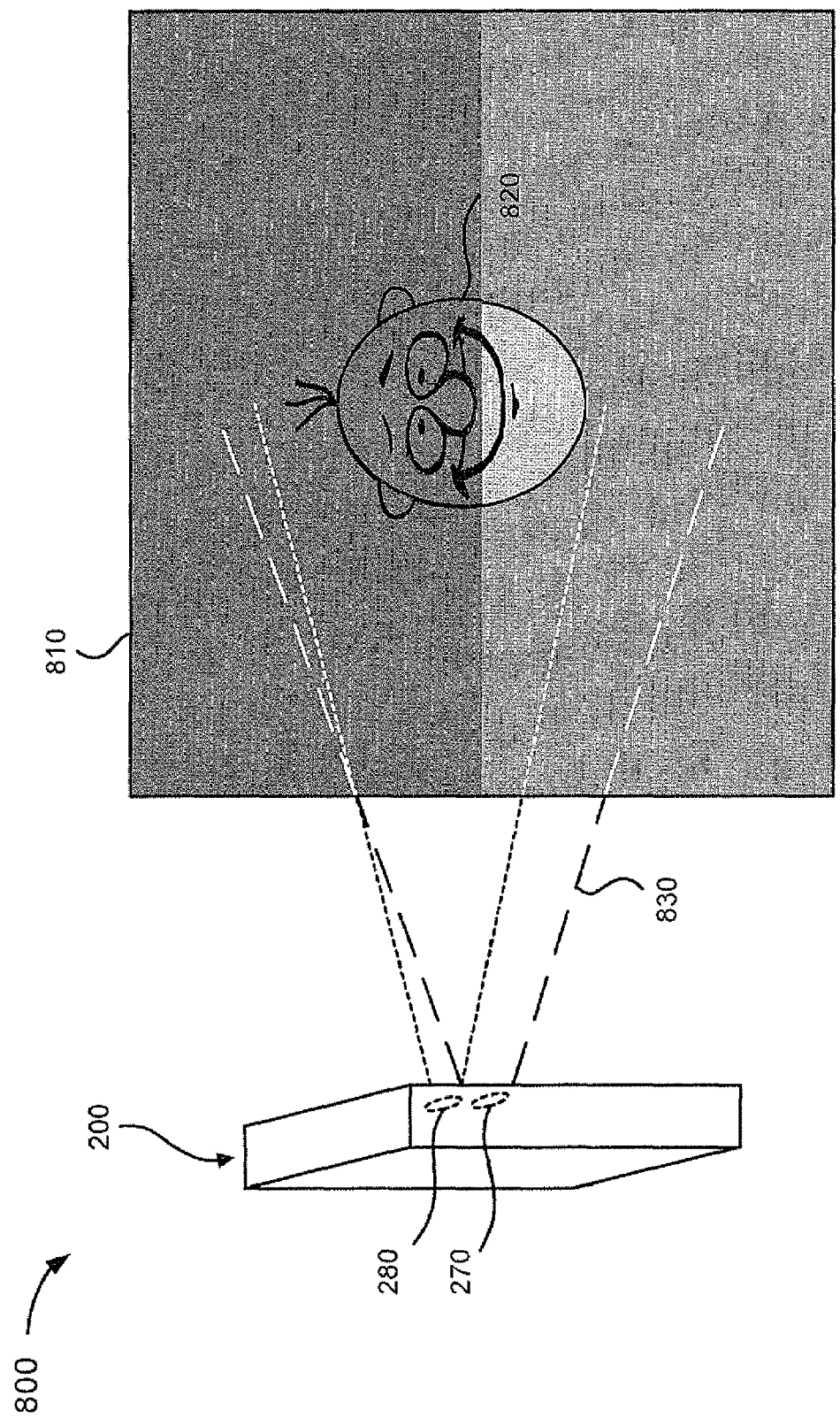
Figure 8B:
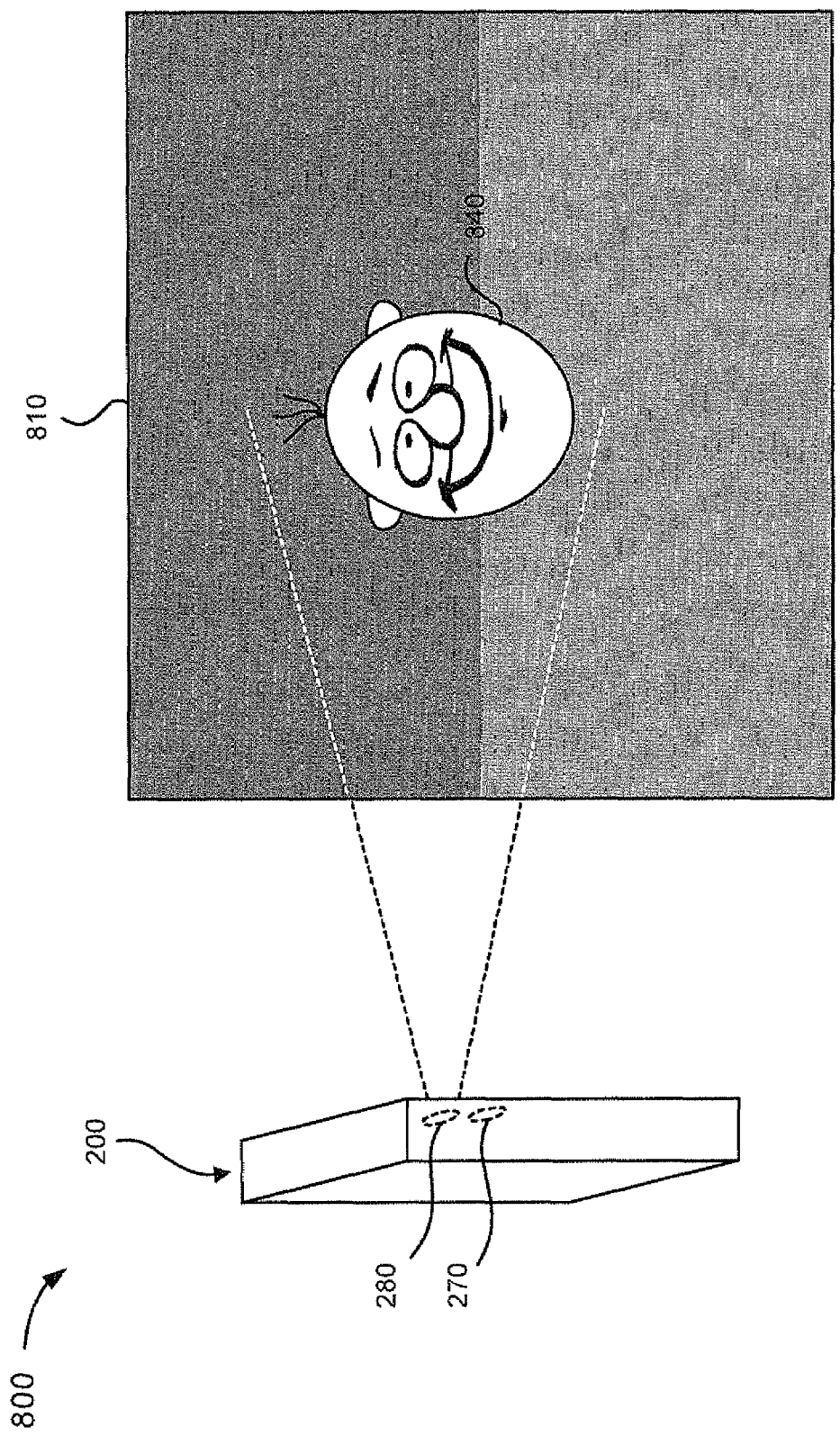

In the second example 800, assume that a user of device 200 wants to project an image of a white-colored face onto a surface 810, illustrated in FIG. 8A. For this example, assume that a top portion of surface 810 is red-colored and a bottom portion of surface 810 is green-colored. Device 200 may project image 820 onto surface 810, via projector 280. Device 200 may then capture a picture 830 of image 820 via camera 270. Device 200 may analyze the picture captured by camera 270 by, for example, comparing the colors in the picture to the colors of image 820 (as stored in device 200), and determine whether a color adjustment is needed. In this example, assume that the red and green colors of surface 810 affects the projection of image 820 such that device 200 determines that a color adjustment is needed. Device 200 may adjust the color output by projector 280 based on the picture. For example, device 200 may subtract red from and/or add in blue and green to a portion of an image projected onto the top portion of surface 810 and subtract green from and/or add in red and blue to that portion of the image that is projected onto the bottom portion of surface 810. Device 200 may then re-project the image of the face (denoted as 840 in FIG. 8B) with the adjusted colors onto surface 810.

Figure 9:
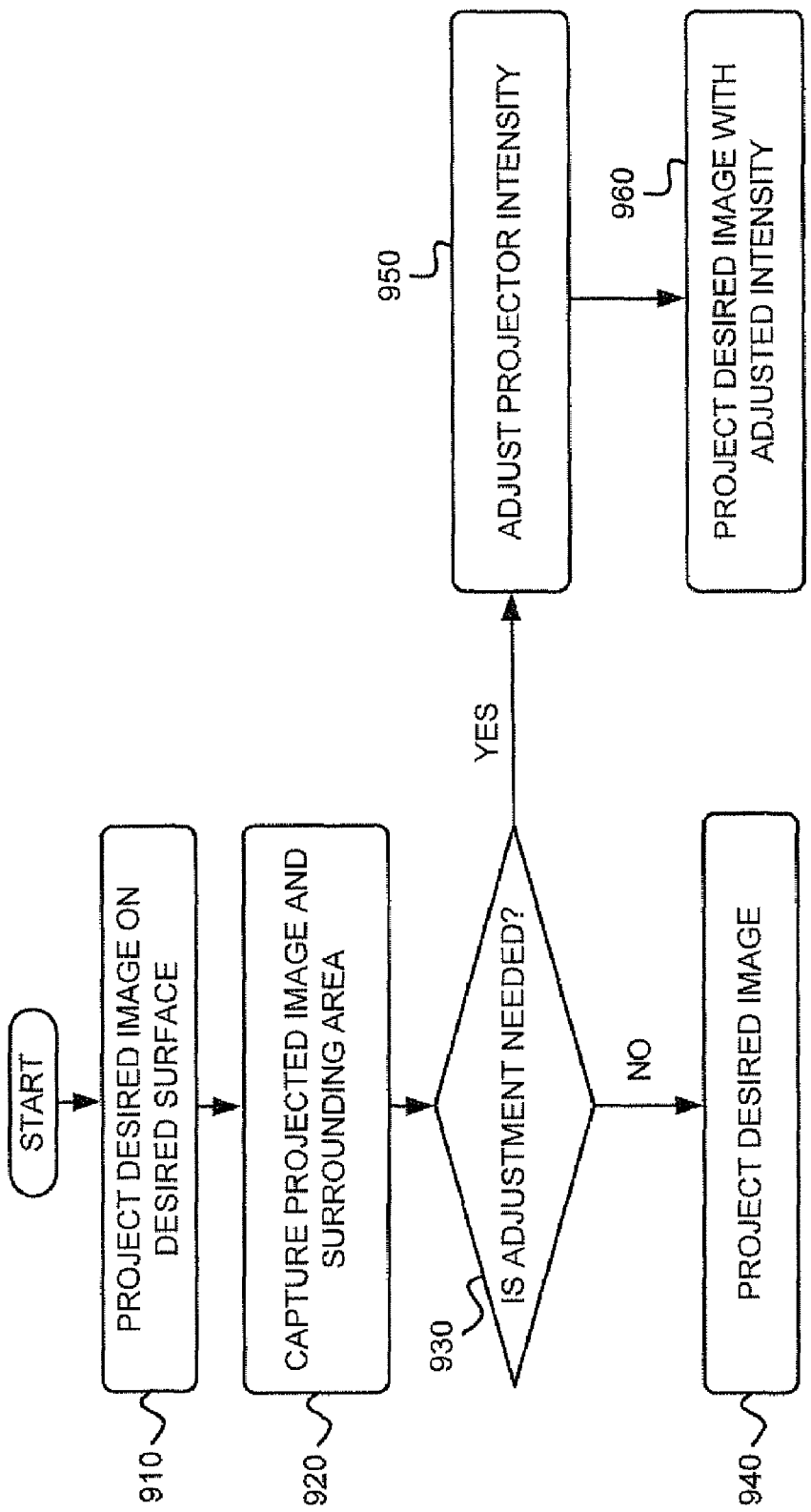
FIG. 9 is a flow chart of an exemplary process for adjusting an intensity of a projector in an implementation consistent with principles of the invention.

FIG. 9 is a flowchart of exemplary processing according to an implementation consistent with principles of the invention. The process of FIG. 9 may be performed by a device, such as device 200. Processing may begin with device 200 projecting a desired image on a desired surface (block 910). Projector 280 may project the desired image in response to some event, such as a user action.

While the image is being projected on the desired surface, device 200 may capture the projected image and a portion of the area surrounding the projected image (block 920). For example, camera 270 may capture a picture of the projected image and the portion of the surrounding area. The captured picture may include the entire projection area. In some instances, camera 270 may capture a picture of less than the entire projection area (e.g., when the surface is of uniform color and texture). Camera 270 may capture the picture automatically (e.g., in response to projector projecting the desired image, at predetermined intervals, etc.) or in response to a user action (e.g., the user pressing a shutter release).

Device 200 may determine whether an adjustment to projector 280 is needed (block 930). For example, in one implementation consistent with principles of the invention, device 200 may identify the lightest portion in the projected image (e.g., based on prior knowledge of contrast in the image that is being projected) and compare the intensity of this identified portion to the intensity of the surrounding area, which is illuminated by ambient light. If the contrast between the identified portion and the ambient illumination of the surrounding area is within an acceptable threshold, device 200 may determine that no adjustment is necessary. Device 200 may then continue projecting the desired image at the current intensity setting (block 940). In some instances, device 200 may actually reduce the projection intensity of projector 280 if the contrast is better than needed in order to save power.

If the contrast between the identified portion and the ambient illumination of the surrounding area is too small (beyond an acceptable threshold), device 200 may determine that an adjustment is necessary. If device 200 determines that an adjustment is needed (block 930), device 200 may adjust the projection intensity of projector 280 (block 950). For example, projector adaptation module 420 may increase an intensity setting of projected images to achieve the desired result. Projector 280 may, in cooperation with projector adaptation module 420, project the desired image at the increased intensity setting (block 960).

The above adjustment processing may be performed once (e.g., in response to projecting a first image via projector 280) or continually (e.g., at predetermined intervals, each time a different image is projected via projector 280, etc.).

Figure 10:
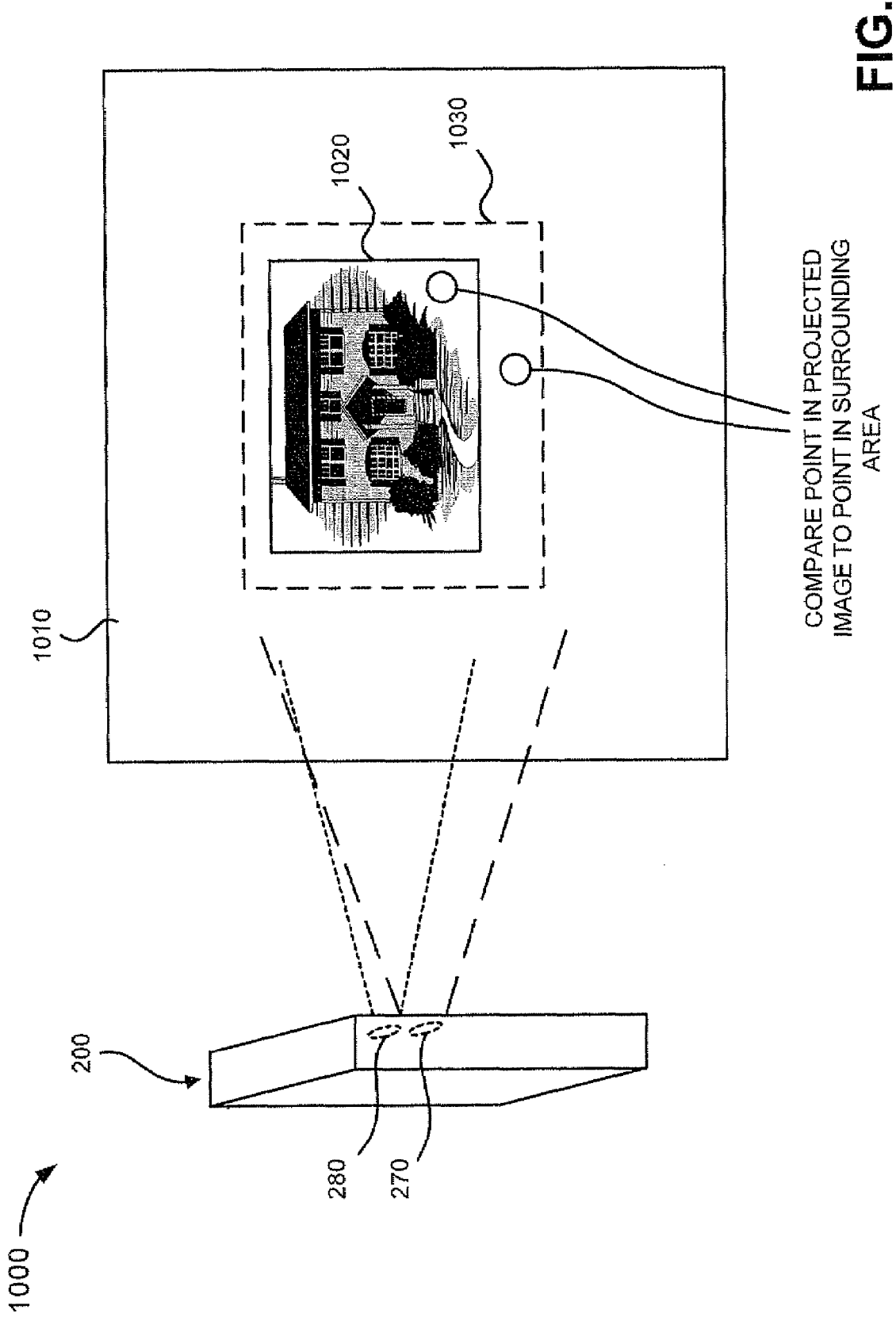
FIG. 10 is a diagram of exemplary processing consistent with the flow chart of FIG. 9.

The following example illustrates the processing described above with respect to FIG. 9. In this example 1000, assume that a user of device 200 projects an image onto a surface 1010, as illustrated in FIG. 10. Device 200 may project a desired image 1020 onto surface 1010, via projector 280. Device 200 may then capture a picture 1030 of projected image 1020 and an area outside of projected image 1020 (e.g., a surrounding area) via camera 270. Device 200 may analyze the picture captured by camera 270 and determine whether an intensity adjustment is needed. In this example, device 200 may compare the intensity of the lightest portion of projected image 1020 to the intensity of the area outside of projected area 1020. In this example, assume that the contrast between the projected portion and the area outside of projected area 1020 is too small (beyond an acceptable threshold). Device 200 may increase the intensity at which the image is projected.

Figure 11:
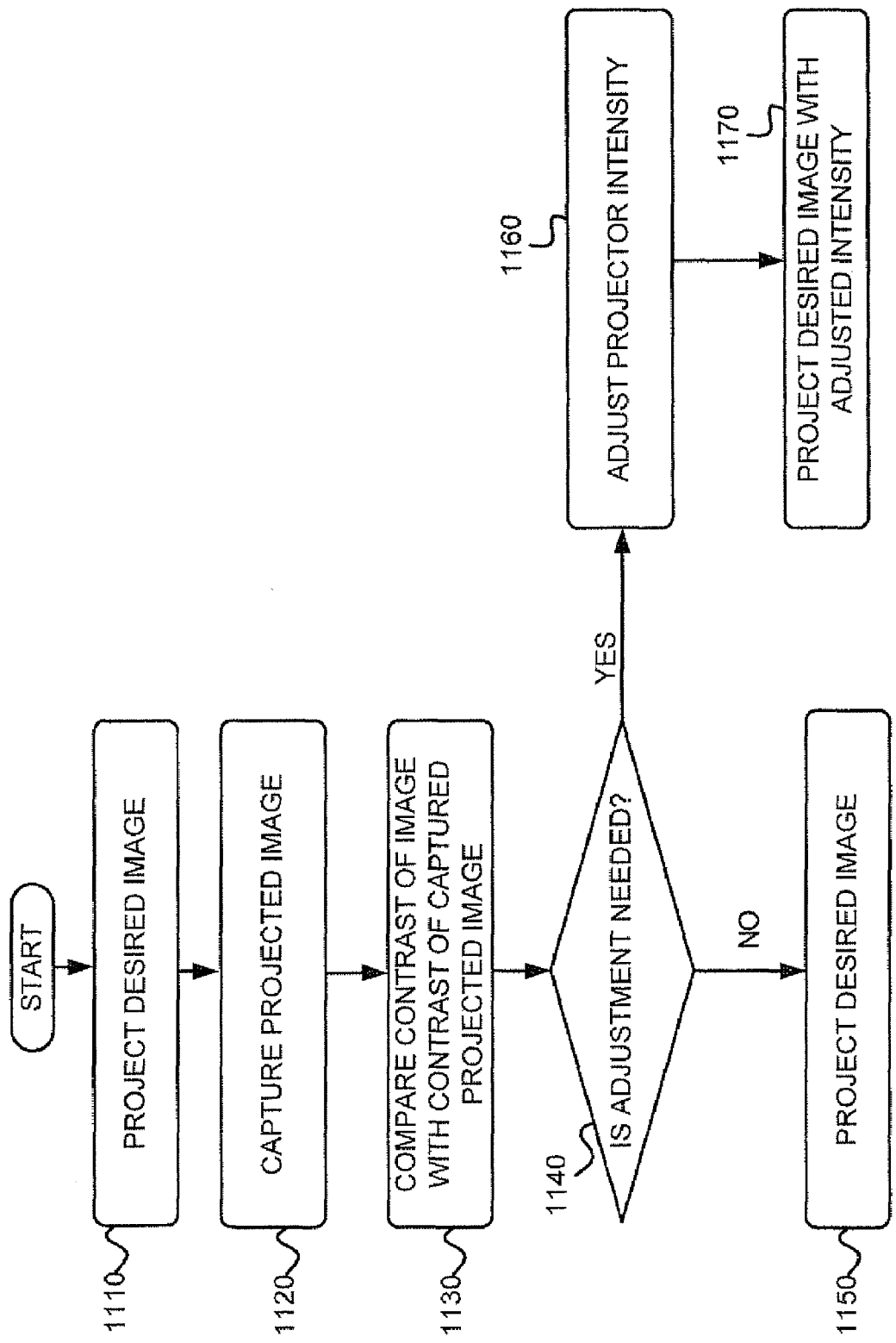
FIG. 11 is a flow chart of another exemplary process for adjusting an intensity of a projector in an implementation consistent with principles of the invention.

FIG. 11 is a flowchart of exemplary processing according to another implementation consistent with principles of the invention. The process of FIG. 11 may be performed by a device, such as device 200. Processing may begin with device 200 projecting a desired image on a desired surface (block 1110). Projector 280 may project the desired image in response to some event, such as a user action.

While the desired image is being projected on the desired surface, device 200 may capture the projected image (block 1120). For example, camera 270 may capture a picture of the area of the desired surface on which the image is being projected. The captured picture may include the entire projection area. Camera 270 may capture the picture automatically (e.g., in response to projector projecting the desired image, at predetermined intervals, etc.) or in response to a user action (e.g., the user pressing a shutter release).

Device 200 may compare the contrast of the projected image that is captured by camera 270 to the contrast of the desired image that is being projected by projector 280 (block 1130). For example, image processing module 410 may receive the image that is being projected by projector 280 (e.g., from storage 320) and the image captured by camera 270. Image processing module 410 may measure the contrast of the projected image and the desired image (e.g., by comparing the lightest and darkest portions in the images). Image processing module 410 may compare the measured contrast of the projected image to the contrast of the desired image.

Device 200 may determine whether an adjustment to projector 280 is needed (block 1140). If, for example, the contrast of the projected image that is captured by camera 270 substantially matches (e.g., within some threshold) the contrast of the desired image, device 200 may determine that no intensity adjustment is needed. Device 200 may then continue projecting the desired image at the current intensity setting (block 1150). In some instances, device 200 may actually reduce the projection intensity of projector 280 if the contrast is better than the contrast of the desired image in order to save power.

If, on the other hand, the contrast of the projected image that is captured by camera 270 does not substantially match (e.g., within some threshold) the contrast of the desired image, image processing module 410 may determine the proper intensity adjustment for projecting the desired image so that the contrast of the image as projected on the desired surface substantially matches the contrast of the desired image stored in storage 320 (block 1160). For example, if the contrast of the captured image is too low (e.g., because the ambient illumination is too high compared to the projected image), image processing module 410 may increase the intensity at which the desired image is projected to make the contrast of the projection of the desired image more substantially match the contrast of the desired image. Projector 280 may, in cooperation with projector adaptation module 420, project the desired image with the adjusted intensity (block 1170).

The above adjustment processing may be performed once (e.g., in response to projecting a first image via projector 280) or continually (e.g., at predetermined intervals, each time a different image is projected via projector 280, etc.).

Figure 12:
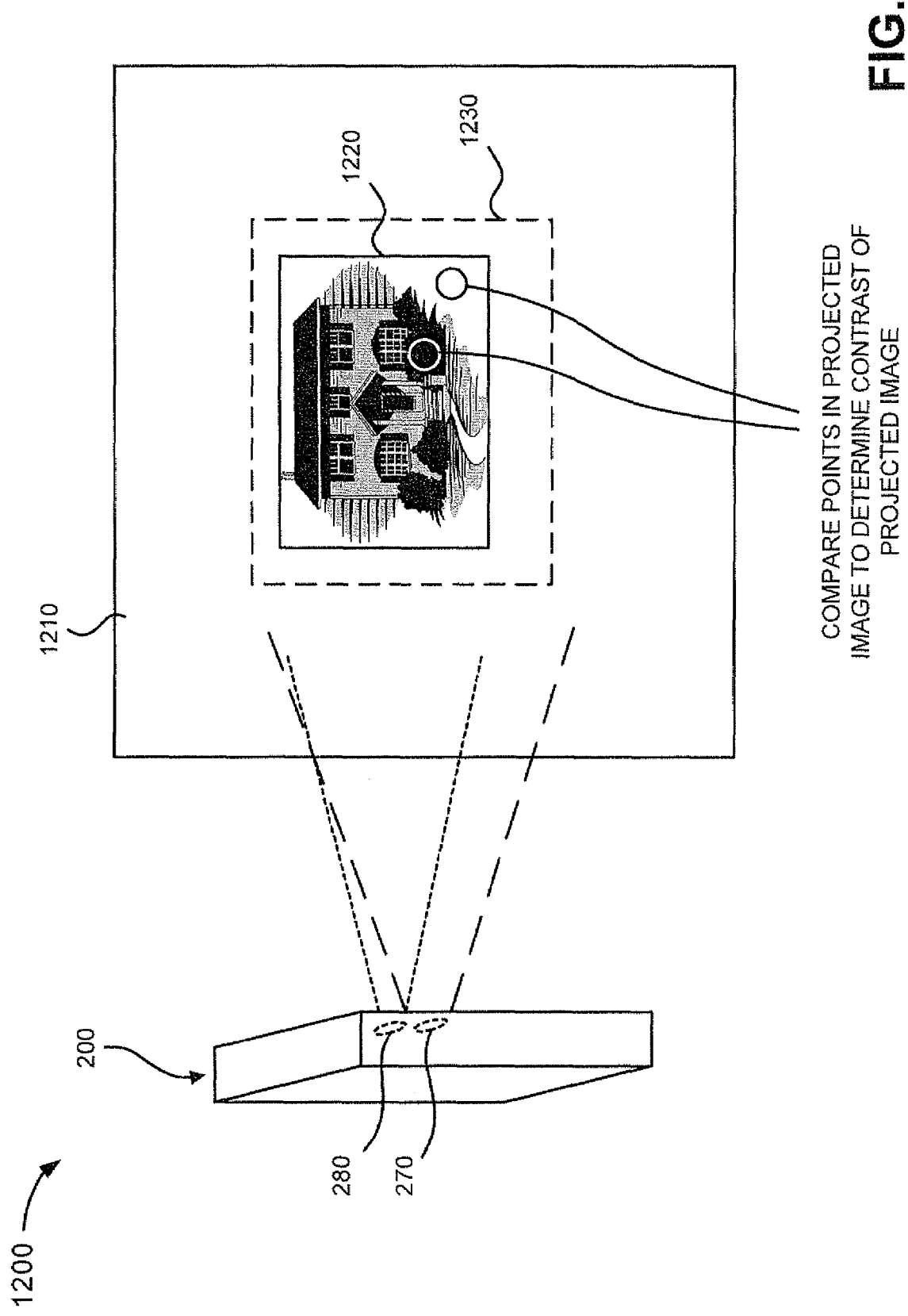
FIG. 12 is a diagram of exemplary processing consistent with the flow chart of FIG. 11.

The following example illustrates the processing described above with respect to FIG. 11. In this example 1200, assume that a user of device 200 projects an image onto a surface 1210, as illustrated in FIG. 12. Device 200 may project a desired image 1220 onto surface 1210, via projector 280. Device 200 may then capture a picture 1230 of projected image 1220 via camera 270. Device 200 may analyze the picture captured by camera 270 and determine whether an intensity adjustment is needed. In this example, device 200 may compare the contrast of projected image 1220 (e.g., by comparing the lightest and darkest portions of projected image 1220) to the contrast of the actual image being projected. In this example, assume that the contrast of the projected image does not substantially match the contrast of the actual image (beyond an acceptable threshold). Device 200 may increase the intensity at which the image is projected.

CONCLUSION

Implementations consistent with principles of the invention may relate to adjusting projector settings based on an image captured by a camera.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while two separate color adjustment processes are described above, in other implementations consistent with principles of the invention, the process described above in connection with FIG. 5 may be used in conjunction with the process described above in connection with FIG. 6. For example, device 200 may adjust the color of images projected by projector 280 using the processing described above with respect to FIG. 5. Device 200 may then use the processing described above with respect to FIG. 6 to ensure that the color adjustments performed in connection with the processing of FIG. 5 have resulted in and/or continue to result in a projected image with a color that substantially matches the original image.

Moreover, it will be appreciated that the processing described in connection with FIG. 5 and/or FIG. 6 above may be performed in conjunction with the processing described above in connection with FIG. 9 or FIG. 11 in some implementations consistent with the principles of the invention.

Moreover, it will be appreciated that as an alternative or in addition to adjusting the color and intensity output of projector 280, in other implementations consistent with principles of the invention, one or more other projector settings may be adjusted.

While series of acts have been described with regard to FIGS. 5, 6, 9, and 11, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   projecting, via a projector, an image onto a surface; and
   using a picture of the projected image and a portion of an area surrounding the projected image to automatically alter a setting of the projector, the using the picture including:
   identifying a lightest portion in the projected image, and
   comparing an intensity of the identified lightest portion to an intensity of the portion of the area surrounding the projected image.

2. The method of claim 1, where projecting the image includes:
   projecting a predetermined image.

3. The method of claim 1, where using the picture further includes:
   capturing the picture of the image while it is being projected onto the surface, and
   analyzing the captured picture to determine whether to perform a color adjustment.

4. The method of claim 3, where capturing the picture occurs automatically in response to projecting an image onto a surface.

5. The method of claim 1, where using the picture includes:
   capturing the picture of the image while the image is being projected onto the surface.

6. The method of claim 5, where capturing the picture occurs automatically in response to the projecting an image onto a surface.

7. The method of claim 5, where capturing the picture occurs at predetermined intervals.

8. The method of claim 1, where the setting includes an intensity setting.

9. The method of claim 1, where the setting includes a color setting and an intensity setting.

10. A device comprising:
    a projector to project an image onto a surface;
    a camera to capture a picture of the image while it is being projected onto the surface;
    memory to store instructions; and
    a processor to execute the instructions to:
    receive the picture,
    compare an intensity of a first portion of the picture to an intensity of a second portion of the picture, and
    adjust a setting of the projector when the intensity of the first portion is within a threshold of the intensity of the second portion.

11. The device of claim 10, where the camera is to capture the picture automatically in response to the projector projecting the image.

12. The device of claim 10, where the camera is further to:
    capture a picture of the projected image at predetermined intervals.

13. The device of claim 10, where when adjusting a setting, the a processor is further to execute the instructions to:
    use the picture to determine whether to perform an intensity adjustment.

14. A computer-readable medium to store instructions that, when executed by at least one processor, cause the at least one processor to perform a method comprising:
    receiving a picture of an image projected onto a surface by a projector and a portion of an area surrounding the projected image; and
    adjusting a setting of the projector based on the received picture, the adjusting including:
    identifying a lightest portion in the projected image, and comparing an intensity of the identified lightest portion to an intensity of the portion of the area surrounding the projected image.

15. The method of claim 14, where adjusting the setting includes:

adjusting an intensity output by the projector.

16. A method comprising:

projecting, via a projector device, an image onto a surface;

capturing, via the projector device, a picture of the projected image; and adjusting, via the projector device, a setting of the projector device based on a content of the captured picture, the adjusting including:

comparing an intensity of a first portion of the captured picture to an intensity of a second portion of the captured picture, and adjusting an intensity output of the projector when the intensity of the first portion substantially matches the intensity of the second portion.

17. The method of claim 16, where the image is a user-specified image.

18. The method of claim 16, further comprising:

re-projecting the image based on an adjusted setting.

19. A device comprising:

means for projecting an image onto a surface;

means for capturing a picture of the projected image and a portion of an area surrounding the projected image; and means for adjusting an intensity of at least one image projected by the means for projecting based on identifying a lightest portion in the projected image and comparing an intensity of the identified lightest portion to an intensity of the portion of the area surrounding the projected image.

* * * * *